May 8, 1956 G. W. SCHROEDER 2,744,990
ULTRAHIGH FREQUENCY HEATING APPARATUS
Filed Jan. 24, 1951 2 Sheets-Sheet 1
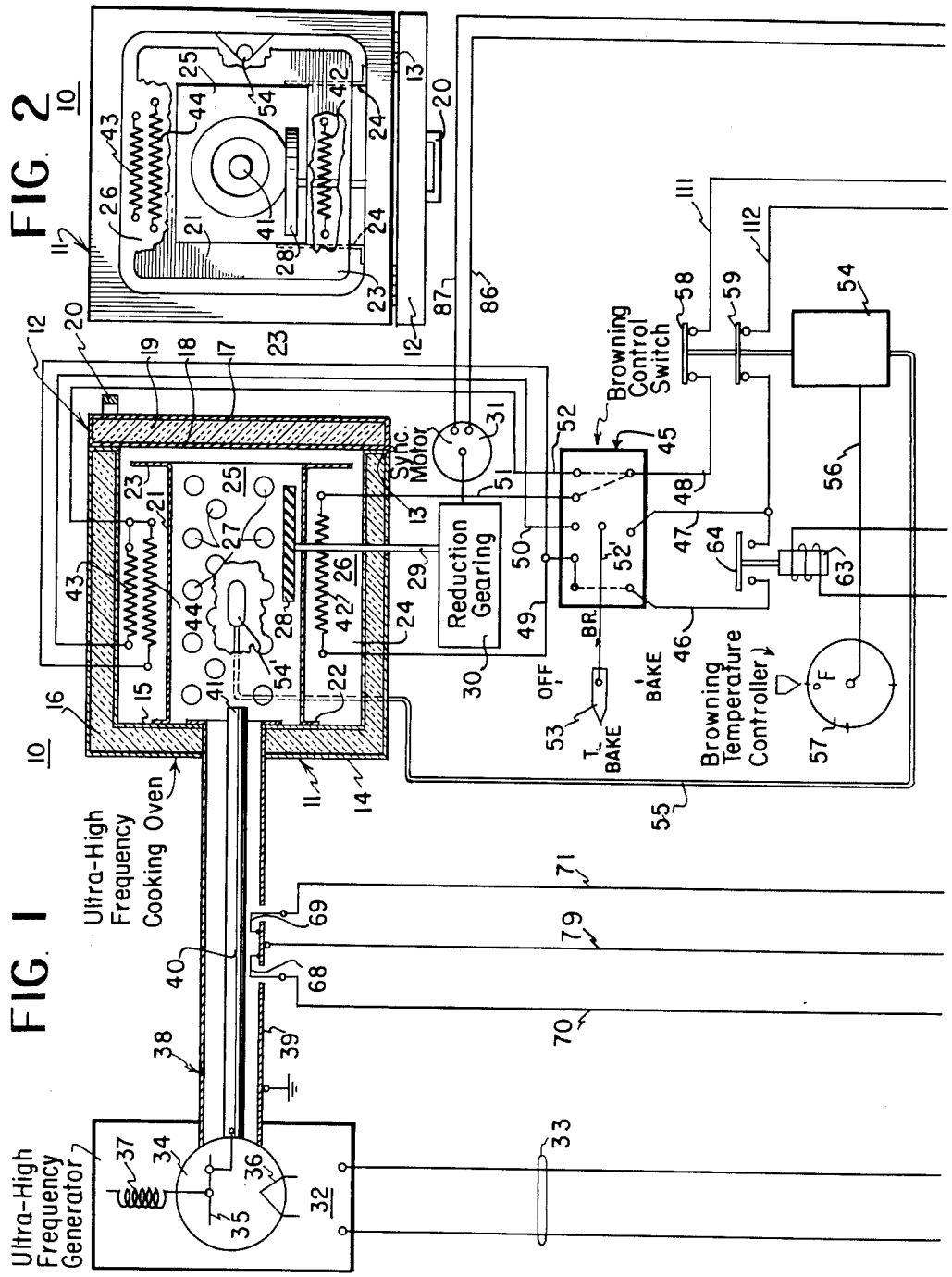
INVENTOR.
George W. Schroeder
BY
Smith, Olsen + Baird
Attys.

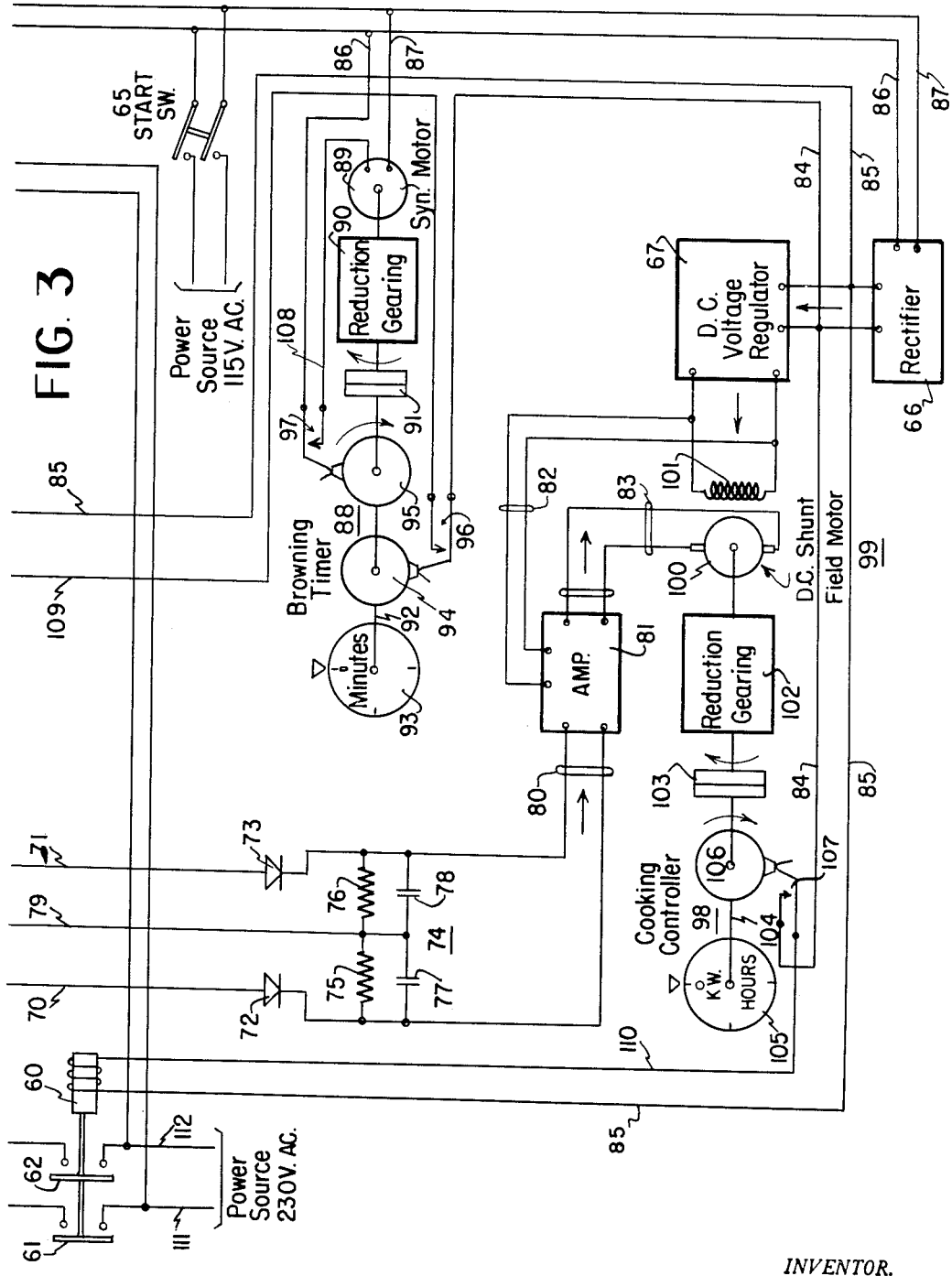

United States Patent Office 2,744,990
Patented May 8, 1956

2,744,990

ULTRAHIGH FREQUENCY HEATING APPARATUS

George W. Schroeder, Sandy Hook, Conn., assignor to General Electric Company, a corporation of New York Application January 24, 1951, Serial No. 207,454

10 Claims. (Cl. 219—10.55)

The present invention relates to combination ultra-high frequency electromagnetic heating and electric radiant heating apparatus, and more particularly to improved apparatus of the general character disclosed in U. S. Patent No. 2,597,825, granted on May 20, 1952, to George W. Schroeder.

In the Schroeder Patent No. 2,597,825, there is disclosed a combination ultra-high frequency electromagnetic heating and electric radiant heating method and apparatus, whereby semi-conducting foods such as bakery goods (cakes, pies, and the like) and roasts (meat, poultry, and the like) may be cooked by simultaneously subjecting the foods to ultra-high frequency electromagnetic energy and to electric radiant energy in a shielded cavity. The electromagnetic energy produces a deep cooking effect in the food and the radiant energy produces a surface browning effect on the food, whereby the food is thoroughly cooked and browned in a very short time interval. In accordance with this method and apparatus, these two heating effects are carried out at least partially concurrently upon two appropriate time interval bases.

While the method and apparatus disclosed in the Schroeder Patent No. 2,597,825 are quite satisfactory in operation, it has been discovered that considerable experience on the part of the cook is required therewith in order to obtain consistent results, particularly with regard to the appropriate time interval control of the electromagnetic energy. For example, it has been discovered that two roasts of meat of a given grade and character and of the same weight, but of different shapes, require exposure to the electromagnetic energy for somewhat diferenet time intervals in order to obtain the same deep cooking effect therein. Also it has been discovered that the rate of absorption of electromagnetic energy by a roast of meat depends upon the state thereof and changes as the cooking of the roast of meat proceeds. Thus these discoveries have suggested that the control of the electromagnetic energy on a time interval basis is not ideal. On the other hand, the control of the electric radiant energy on a time energy basis is quite satisfactory.

More specifically in the operation of the ultra-high freqency electromagnetic heating apparatus, the generator supplies incident electromagnetic energy via the associated transmission line to the cavity, and reflected electromagnetic energy is returned from the cavity via the transmission line to the generator, whereby only the difference between these two electromagnetic energies or the net electromagnetic energy is absorbed by the food in the cavity effecting cooking thereof. Fortunately substantially all of the net electromagnetic energy that is supplied by the generator is absorbed by the food as the losses in the cavity are entirely negligible. As previously noted, the shape of the food being cooked has a bearing on its reflective characteristic and the consequent net electromagnetic energy that is absorbed thereby during a given time interval. Moreover, the dielectric properties of the food and the consequent absorption characteristic thereof change during the cooking of the food. Specifically it has been discovered that the dielectric properties of a roast of meat change tremendously from the frozen state to the thawed state, and change significantly from the thawed raw state to the thawed cooked state, effecting corresponding reductions in the rate of absorption by the food of the ultra-high frequency electromagnetic energy.

In view of the foregoing considerations, the development of the present method and apparatus were undertaken, whereby the control of the ultra-high frequency electromagnetic energy supplied from the generator to the cavity is based upon the net ultra-high frequency electromagnetic energy supplied by the generator, which corresponds to the absolute amount of the ultra-high frequency electromagnetic energy that is absorbed by the food in the cavity. In this undertaking, it has been discovered that the ultimate deep cooking effect that is produced in the food is dependent substantially entirely upon the amount of ultra-high frequency electromagnetic energy that is absorbed thereby and is substantially independent of the cooking time interval. Since the control of the supply of the ultra-high frequency electromagnetic energy is upon the basis noted in the present method and apparatus, the shape of the food and the rate at which the absorption of the ultra-high frequency electromagnetic energy changes as cooking of the food proceeds become immaterial to uniform and consistent results in the cooking of the food.

In passing, it is noted that the development of the ultra-high frequency electromagnetic energy heating apparatus of the present invention also required the development of the present ultra-high frequency electromagnetic energy measuring apparatus in view of the absence of suitable apparatus for the purpose noted in this field.

Accordingly it is the general object of the present invention to provide cooking apparatus, whereby foods of different sizes, shapes and energy absorbing characteristics may be readily cooked with ultra-high frequency electromagnetic energy in a simple and convenient manner and with consistent cooking results.

Another object of the invention is to provide heating apparatus in which the supply of ultra-high frequency electromagnetic energy is controlled in response to the absolute amount of the energy that is absorbed by the material that is being heated.

Another object of the invention is to provide heating apparatus employing both ultra-high frequency electromagnetic energy and electric radiant energy in which the supply of the ultra-high frequency electromagnetic energy is controlled upon an absolute energy absorption basis and in which the supply of the electric radiant energy is controlled upon a time interval basis.

Another object of the invention is to provide heating apparatus wherein each of the controls noted may be selectively and independently manually preset.

A further object of the invention is to provide in heating apparatus of the combination ultra-high frequency electromagnetic energy and electric radiant energy type, an improved arrangement for electrically shielding from the ultra-high frequency electromagnetic energy, the electric heating unit that provides the radiant energy and the thermal responsive element that selectively controls the supply of electric current to the electric heating unit.

A still further object of the invention is to provide in heating apparatus of the combined ultra-high frequency electromagnetic energy and electric radiant energy type, an improved electric circuit network for selectively and independently controlling the supply of the two types of energy thereto.

Further features of the invention pertain to the particular arrangement of the elements of the heating apparatus, whereby the above-outlined and additional operating features thereof are attained.

The invention, both as to its organization and method of operation, together with further objects and advantages thereof, will best be understood by reference to the following specification taken in connection with the accompanying drawings in which Figure 1 is a longitudinal sectional view, partly broken away, of a cooking oven of the combination ultra-high frequency electromagnetic energy and electric radiant energy type embodying the present invention; Fig. 2 is a front elevational view, partly broken away of the cooking oven shown in Fig. 1, illustrating the door thereof in its open position; and Figs. 1 and 3, taken together, are a diagrammatic illustration of the circuit network for controlling the cooking oven shown in Figs. 1 and 2, and also embodying the present invention. In order to form a unified diagram, Figs. 1 and 3 should be arranged lengthwise in respective upper and lower positions.

Referring now to Figs. 1 and 2 of the drawings, the heating apparatus there illustrated and embodying the features of the present invention comprises a cooking oven 10 that is fundamentally of the construction and arrangement of that disclosed in the previously mentioned Schroeder application, and which further embodies a turntable arrangement for rotatably supporting the food for the purpose of distributing the heating effects therein that is disclosed in U. S. Patent No. 2,632,838, granted on March 24, 1953, to George W. Schroeder.

The cooking oven 10 comprises a casing 11 provided with an open front and a cooperating door 12, the door 12 being hinged along its lower edge, as indicated at 13, to the lower portion of the casing 11 and movable between open and closed positions with respect to the open front of the casing 11. The casing 11 is of hollow construction including a metal outer shell 14 and a metal inner shell 15 arranged in spaced-apart relation, the space between the shells 14 and 15 being filled with a suitable thermal insulating material 16. Also the door 12 is of hollow construction, including a metal outer shell 17 and a metal inner sheet 18 arranged in spaced-apart relation, the space between the shell 17 and the sheet 18 being filled with a suitable thermal insulating material 19. Finally a handle 20 is carried by the outer shell 17 of the door 12 adjacent to the upper edge thereof in order to facilitate movement of the door 12 between its open and closed positions, the door 12 being movable between a substantially horizontal open position and a substantially vertical closed position.

Also the cooking oven 10 comprises a metal liner 21 of generally tubular form and substantially rectangular in cross-section and disposed substantially centrally within the inner shell 15. More particularly the rear end of the liner 21 terminates in an outwardly directed flange 22 that is arranged in abutting engagement with the rear wall of the inner shell 15 and suitably secured thereto; while the front end of the liner 21 terminates in an outwardly directed flange 23 that is arranged in spaced-apart relation with respect to the inner sheet 18 of the door 12 when the door 12 occupies its closed position. The liner 21 is further supported in its substantially central position in the inner shell 15 by two substantially L-shaped feet 24 secured thereto in laterally spaced-apart relation and engaging the bottom wall of the inner shell 15. The liner 21 defines an elongated tubular cavity 25 therein that is substantially centrally disposed with respect to the inner shell 15; and since the liner 21 is spaced inwardly from the walls of the inner shell 15, a surrounding space or compartment 26 is defined therebetween. Finally the liner 21 is perforated, having a plurality of holes 27 formed therein that are utilized for a purpose more fully explained hereinafter.

Also the cooking oven 10 comprises a rotatably mounted turntable 28 formed of lava or other dielectric material and arranged within the cavity 25 formed in the liner 21, the turntable 28 being offset in both the longitudinal direction and the lateral direction with respect to the center of the bottom wall of the liner 21 for a purpose more fully explained hereinafter. Specifically the turntable 28 is carried by a rotatable shaft 29 that projects to the exterior through suitable openings provided in the bottom wall of the liner 21 and the bottom walls of the shells 15 and 14, the outer end of the shaft 29 being connected to reduction gearing 30, that is, in turn, operated by a synchronous motor 31 of the Telechron type. Thus it will be understood that when the motor 31 is operated at its usual speed, the shaft 29 is rotated at a slower speed due to the reduction gearing 30 so that the turntable 28 carried on the end of the shaft 29 is rotated at a relatively low speed to effect rotation of the supported food in the cavity 25.

Further the cooking oven 10 comprises an ultra-high frequency electromagnetic wave generator 32 that is provided with power input conductors 33 that are connectible to a source of power supply, as more fully explained hereinafter. The generator 32 is capable of generating alternating current power at an ultra-high frequency of the order of 1000 megacycles, and is of the magnetron type. Specifically the generator 32 comprises a magnetron tube 34 that is provided with an anode 35, a cathode 36, and an exciting coil 37. A transmission line in the form of a coaxial line or wave guide 38 is arranged between the generator 32 and the casing 11 and the cavity 25. Specifically the coaxial line 38 comprises the usual outer grounded tubular conductor 39 and the usual insulated centrally disposed rod-like conductor 40, the conductor 40 being arranged within the conductor 39. One end of the conductor 40 is connected to the anode 35 of the magnetron tube 34, and the other end of the conductor 40 projects as an antenna 41 into the cavity 25. Also the grounded outer conductor 39 is electrically connected to the shells 14 and 15 of the casing 11, whereby the shells 14 and 15 of the casing 11, the liner 21, and the shell 17 and the inner sheet 18 of the door 12 are suitably grounded. Thus it will be understood that when the generator 32 is operating, the alternating voltage thereof appears between the antenna 41 and the liner 21, whereby centimeter electromagnetic standing waves are produced in the cavity 25 providing ultra-high frequency electric and magnetic fields permeating the space in the cavity 25.

Further the cooking oven 10 comprises a lower electric heating unit 42 positioned in the passage 26 below the bottom wall of the liner 21 and two upper heating units 43 and 44 positioned in the passage 26 above the top wall of the liner 21, the electric heating unit 44 being arranged outside and in surrounding relation with respect to the electric heating unit 43. The terminals of the electric heating units 42, 43 and 44 are connected to conductors extending to the exterior and terminated upon a manually controlled switch 45 that is preferably of the character of that disclosed in U. S. Patent No. 2,515,427, granted on July 18, 1950, to Herman W. Schulze. More specifically the switch 45 comprises three incoming terminals respectively terminating three conductors 46, 47 and 48 and four outgoing terminals respectively terminating four conductors 49, 50, 51 and 52, as well as switching mechanism that is selectively operative by a rotatable operating shaft 52, the outer end of which carries a control knob 53. The conductor 49 is commonly connected to one terminal of the heating unit 42 and to one terminal of the heating unit 44; the conductor 50 is connected to one terminal of the heating unit 43; the conductor 51 is connected to the other terminal of the heating unit 42; and the conductor 52 is commonly connected to the other terminals of the heating units 43 and 44. The control switch 45 comprises an "off" position, a "broil" position, a "time-bake" position, and a "bake" position; and incident to operation of the control switch 45 into its various positions by rotation of the control knob 53, the conductors 46, 47 and 48 are selectively connected to the conductors 49, 50, 50 and 52 in order to obtain different connections and consequently different heating combinations of the heating units 42, 43 and 44 with respect to the associated source of power supply as fully disclosed in the Schulze patent mentioned and as described in greater particularity hereinafter.

Also the cooking oven 10 comprises a temperature controller 54 that is provided with a thermal responsive element 54' arranged in the passage 26 between the right-hand wall of the liner 21 and the right-hand of the shell 15, the temperature responsive element 54' being connected to the casing of the temperature controller 54 by an associated capillary tube 55. Also the temperature controller 54 is manually settable by an arrangement including a rotatable shaft 56 carrying a control dial 57 on the outer and thereof. Finally the temperature controller 54 comprises two contact bridging members 58 and 59.

Finally the cooking oven 10 is provided with an electric circuit network that includes a first source of power supply of 230 volts A. C., a second source of power supply of 115 volts A. C., a relay contactor 60 provided with two contact bridging members 61 and 62, a relay contactor 63 provided with a contact bridging member 64, a two pole start switch 65, a rectifier 66, and a voltage regulator 67. Also in the circuit network, first and second directional couplers 68 and 69 are operatively associated with transmission line 38, the directional couplers 68 and 69 comprising loops placed in the plane of the transmission line 38 and respectively responsive to the incident traveling ultra-high frequency power and to the reflected traveling ultra-high frequency power in the transmission line 38, as explained more fully hereinafter. The directional couplers 68 and 69 are respectively connected between the outer conductor 39 of the coaxial line 38 and two conductors 70 and 71, which conductors 70 and 71 are respectively connected to two square-law crystal detectors 72 and 73 that may be of the germanium crystal type. In turn, the detectors 72 and 73 are connected to a filter network 74 that comprises two resistors 75 and 76 and two smoothing condensers 77 and 78, the midpoint between the resistors 75 and 76 and the midpoint between the smoothing condensers 77 and 78 being commonly connected together by a conductor 79, that is, in turn, connected to the outer conductor 39 of the coaxial line 38. The outer extremities of the filter network 74 are connected by a pair of conductors 80 to the signal input terminals of an amplifier 81. In turn, the amplifier 81 is provided with a pair of power input terminals that are connected by a pair of conductors 82 to the output terminals of the voltage regulator 67. Further the amplifier 81 is provided with a pair of power output terminals that are connected to a pair of conductors 83 that are employed for a purpose more fully explained hereinafter. Also in the voltage regulator 67 the power input terminals are respectively connected to two conductors 84 and 85 that are connected to the power output terminals of the rectifier 66. Further in the rectifier 66 the power input terminals are respectively connected to two conductors 86 and 87.

Further the circuit network comprises a browning timer 88 that includes a synchronous motor 89 of the Telechron type, connected reduction gearing 90, a connected slip clutch 91 and a main control shaft 92. The outer end of the control shaft 92 carries a control dial 93, and the inner end thereof is operatively connected to the slip clutch 91. The intermediate portion of the control shaft 92 carries two insulating cams 94 and 95 that respectively control two switches 96 and 97.

Further the circuit network comprises a cooking controller 98 that includes a direct current motor 99 of the shunt field type provided with an armature 100 and an exciting field winding 101. The armature 100 is connected to reduction gearing 102, that is, in turn, connected to a slip clutch 103. Also the cooking controller 98 comprises a main control shaft 104, the outer end of which carries a control dial 105, and the inner end of which is operatively connected to the slip clutch 103. The intermediate portion of the control shaft 104 carries an insulating cam 106 that controls a switch 107.

The terminals of the armature 100 are bridged directly across the pair of conductors 83; and the terminals of the field winding 101 are bridged directly across the pair of conductors 82. One terminal of the motor 89 is connected directly to the conductor 87, and the other terminal thereof is connected via a conductor 108 to one terminal of the switch 97, the other terminal of the switch 97 being connected directly to the conductor 86. The conductor 84 is connected directly to one terminal of the switch 96, and the other terminal of the switch 96 is connected via a conductor 109 to one terminal of the winding of the relay 63; the other terminal of the winding of the relay 63 is connected directly to the conductor 85. Also the conductor 84 is connected directly to one terminal of the switch 107, the other terminal of the switch 107 being connected by a conductor 110 to one terminal of the winding of the relay 60; the other terminal of the winding of the relay 60 is connected to the conductor 85. Further the conductors 86 and 87 are connected directly to the start switch 65 that terminates the 115 volt A. C. source of power supply. The 230 volt A. C. source of power supply is connected to two conductors 111 and 112 that terminate upon two of the contacts controlled by the bridging members 61 and 62, the other two contacts controlled by the bridging members 61 and 62 respectively terminating the pair of conductors 33. Also the conductors 111 and 112 terminate upon two of the contacts controlled by the bridging members 58 and 59, the other two contacts controlled by the bridging members 58 and 59 respectively terminating the conductors 48 and 47. Finally the contacts controlled by the bridging member 64 respectively terminate the conductors 46 and 47; and the terminals of the motor 31 are respectively connected to the conductors 86 and 87. A better understanding of the connection and arrangement of the circuit network will be gained from the subsequent description of the operation of the cooking oven 10 in conjunction therewith.

Considering now the construction and arrangement of the cooking oven 10 in greater detail, it is pointed out that the antenna 41 projects forwardly from the rear wall of the inner shell 15 into the cavity 25 a distance of approximately one-quarter wave length of the electromagnetic waves produced in the cavity 25 or about 7½ centimeters. The maximum dimension of the holes 27 provided in the liner 21 does not materially exceed one-eighth wave length of the electromagnetic waves produced in the cavity 25, or about 3¾ centimeters in order to block the passage of material electric and magnetic fields from the cavity 25 through the holes 27 into the passage 26. The front flange 23 provided on the front of the liner 21 is spaced rearwardly from the inner sheet 18 of the door 12 a distance not materially exceeding one-eighth wave length of the electromagnetic waves produced in the cavity 25, or about 3¾ centimeters; and the flange 23 extends outwardly from the walls of the liner 21 toward the walls of the inner shell 15 a distance of about one-quarter wave length of the electromagnetic waves produced in the cavity 25, or about 7½ centimeters. Thus an effective ultra-high frequency choke is provided between the open front of the liner 21 and the passage 26 by the cooperation of the flange 23 and the inner sheet 18 of the door 12 preventing the passage of material electric and magnetic fields from the cavity 25 through the space between the flange 23 and the inner sheet 18 of the door 12 into the passage 26 in order to shield the heating units 42, 43 and 44 and the thermal responsive device 54 against the ultra-high frequency electric and magnetic fields. This arrangement prevents the induction of ultra-high frequency parasitic currents in the heating units 42, 43 and 44 and in the thermal responsive device 54'. Thus the liner 21 constitutes a reticulated metal screen or shield for the electric heating units 42, 43 and 44 and for the thermal responsive device 54' while permitting the passage of radiant heat from the heating units 42, 43 and 44 through the holes 27 into the cavity 25.

As disclosed in the previously mentioned Schulze patent, when the control knob 53 of the control switch 45 is operated from its "off" position into its "time-bake" position circuits are prepared for selectively controlling energization of the heating units 42 and 44 under the control of the relay 63 and the temperature controller 54. More specifically the conductor 46 is connected to the conductor 49, and the conductor 48 is commonly connected to the conductors 51 and 52 by the switching mechanism incorporated in the control switch 45, when the control switch 45 occupies its "time-bake" position, whereby the control of the energization of the heating units 42 and 44 are selectively set.

Considering now the operation of the cooking oven 10 to effect the cooking of food, such for example as a roast of beef: the cook first weighs the roast of beef in order to obtain its gross weight; places the roast in a suitable insulating dish upon the turntable 28 in the cavity 25; and then closes the door 12. The cooking controller 48 is then manually set in accordance with the amount of ultra-high frequency energy that it is desired for the roast to absorb in view of its gross weight. Normally a roast of beef is thoroughly cooked when it absorbs in the thawed state one-twelfth kilowatt hour per pound of the ultra-high frequency electromagnetic energy. Specifically the control dial 105 is rotated in the clockwise direction an appropriate amount dependent on the gross weight of the roast of beef that is to be cooked. For example, should the roast of beef weigh 20 pounds, the control dial 105 is manually set to 20/12 kilowatt hours. As the control dial 105 is manually rotated out of its normal position in the clockwise direction, the control shaft 104 is rotated therewith with respect to the reduction gearing 102, the slip clutch 103 permitting the relative rotation noted. Also as the control shaft 104 is rotated out of its normal position, the control cam 106 closes the associated switch 107 in order to prepare a circuit traced hereinafter for energizing the winding of the relay 60.

Also the browning timer 88 is manually set in accordance with the amount of surface browning that is desired on the roast of beef. Specifically the control dial 93 is rotated in the clockwise direction; and the browning time in the present example might be 20 minutes. As the control dial 93 is manually rotated out of its normal position in the clockwise direction, the control shaft 92 is rotated therewith with respect to the reduction gearing 90, the slip clutch 91 permitting the relative rotation noted. Also as the control shaft 92 is rotated out of its normal position, the control cams 94 and 95 respectively close the switches 96 and 97 in order to prepare circuits traced hereinafter for respectively energizing the winding of the relay 63 and for operating the timer motor 89.

Finally the browning temperature controller 54 is set to the browning temperature that is desired in the cooking oven 10, by appropriate manipulation of the control dial 57; and the browning temperature in the present example might be 500° F.

At this time, the browning temperature controller 54 has been set to 500° F. in accordance with the browning temperature desired in the cooking oven 10; the cooking controller 98 has been set to 20/12 kilowatt hours in accordance with the amount of ultra-high frequency electromagnetic energy that it is desired for the 20 pound roast of beef to absorb in the cooking oven 10; and the browning timer 88 has been set to 20 minutes in accordance with the amount of surface browning desired upon the roast of beef in the cooking oven 10. Accordingly, the cook closes the start switch 65 connecting the 115 volts A. C. source of power to the conductors 86 and 87. At this time, the motor 31 operates to effect rotation of the turntable 28 supporting the roast in the cavity 25 through the reduction gearing 30 and the shaft 29. Also the timer motor 89 is operated, whereby the control shaft 92 is rotated in the counterclockwise direction through the reduction gearing 90 and the slip clutch 91. Further the 115 volts A. C. power is supplied to the rectifier 66 via the conductors 86 and 87, so that D. C. power is supplied from the rectifier 66 to the conductors 84 and 85 to complete a circuit, including the switch 96, for energizing the winding of the relay 63; whereby the bridging member 64 is operated to bridge the associated contacts connecting together the conductors 46 and 47. When the conductor 46 is thus connected to the conductor 47, a circuit is completed, that includes the conductors 111 and 112 and the bridging members 58 and 59, between the 230 volt A. C. source of power and the control switch 45 for the purpose of energizing the heating units 42 and 44. More particularly the conductor 46 is connected to the conductor 49, and the conductor 48 is commonly connected to the conductors 51 and 52 by the switching mechanism in the control switch 45; whereby the heating units 42 and 44 are energized in multiple across the 230 volt A. C. source of power. The temperature of the heating units 42 and 44 rises rapidly, whereby the radiant heat therefrom is projected through the holes 27 in the liner 21 into the cavity 25 effecting browning of the roast supported by the turntable 28 in an obvious manner.

Also the supply of D. C. power to the conductors 84 and 85 completes a circuit, including the switch 107, for energizing the winding of the relay 60, whereby the relay 60 operates to effect connection, at the bridging members 61 and 62, between the conductors 111 and 112 and the pair of conductors 33 so that operation of the ultra-high frequency generator 32 is initiated. The generator 32 operates to supply ultra-high frequency electromagnetic energy to the conductor 40 of the coaxial line 38, whereby the antenna 41 radiates this electromagnetic energy in the cavity 25 causing electromagnetic standing waves to permeate the cavity 25 and the roast supported by the turntable 28 so as to effect deep cooking thereof. Thus in the operation of the cooking oven 10, the interior of the roast is heated and cooked primarily by the ultra-high frequency electromagnetic energy supplied from the generator 32, while the exterior or surface of the roast is heated and cooked jointly by the electromagnetic energy and by the radiant energy provided by the heating units 42 and 44. In fact, the browning of the exterior or surface of the roast is performed substantially entirely by the radiant heat produced by the heating units 42 and 44.

In the operation of the cooking oven 10, incident ultra-high frequency electromagnetic energy travels from the generator 32 to the cavity 25 via the coaxial line 38; and reflected ultra-high frequency electromagnetic energy travels from the cavity 25 back to the generator 32 via the coaxial line 38. The directional coupler 68 is arranged and poled with respect to the incident ultra-high frequency electromagnetic traveling wave in the coaxial line 38 to derive a first ultra-high frequency current that is proportional to the incident power of the wave noted; while the directional coupler 69 is arranged and poled with respect to the reflected ultra-high frequency electromagnetic traveling wave in the coaxial line 38 to derive a second ultra-high frequency current that is proportional to the reflected power of the wave noted. The first current mentioned derived by the directional coupler 68 is rectified by the square-law crystal detector 72 to produce a third ultra-high frequency pulsating current that is proportional to the square of the first current mentioned; and the second current mentioned derived by the directional coupler 69 is rectified by the square-law crystal detector 73 to produce a fourth ultra-high frequency pulsating current that is proportional to the square of the second current mentioned. The third and fourth currents mentioned are applied in opposition to each other to the extremities of the resistors 75 and 76, whereby the smoothing condensers 77 and 78 produce a unidirectional voltage that is proportional to the difference between the third and fourth current mentioned. This unidirectional voltage is applied via the pair of conductors 80 to the signal input terminals of the amplifier 81, whereby the power output terminals of the amplifier 81 are supplied with an amplified output voltage that is proportional to the signal input voltage. The amplifier 81 is supplied with D. C. power via the conductors 82 from the voltage regulator 67, whereby the instantaneous amplified output voltage from the amplifier 81 is proportional to the net instantaneous ultra-high frequency electromagnetic power that is supplied from the generator 32 to the cavity 25 and absorbed by the roast supported upon the turntable 28 in the cavity 25. The shunt field winding 101 of the motor 99 is directly energized from the output terminals of the voltage regulator 67; and the amplified output voltage of the amplifier 81 is directly applied via the pair of conductors 83 to the terminals of the armature 100 of the motor 99, whereby the instantaneous speed of the armature 100 of the motor 99 is proportional to the net instantaneous ultra-high frequency electromagnetic power that is supplied from the generator 32 to the cavity 25. More specifically, the armature 100 rotates in the counterclockwise direction effecting rotation of the control shaft 104 in the counterclockwise direction through the reduction gearing 102 and the slip clutch 103. Accordingly, the motor 99 integrates the instantaneous amplified voltage applied to the armature 100 thereof producing a number of revolutions of the armature 100 during a given time interval that is proportional to the product of the amplified voltage applied to the armature 100 and the time interval of the application of the voltage mentioned. Hence, the angle of arc through which the control shaft 104 is rotated in a given time interval is proportional to the net ultra-high frequency electromagnetic energy that is supplied from the generator 32 to the cavity 25 during the given time interval mentioned.

During the operation of the heating apparatus 10 and upon the expiration of the 20 minutes that have been preset upon the control dial 93 of the browning timer 88, the motor 89 drives the control shaft 92 back into its normal position causing the control cams 94 and 95 to open the switches 96 and 97. When the switch 96 is thus opened, the circuit for energizing the winding of the relay 63 is interrupted causing the relay 63 to restore, whereby the bridging member 64 disconnects the conductors 46 and 47 effecting deenergization of the heating units 42 and 44. When the switch 97 is thus opened, the circuit for operating the motor 89 is interrupted, whereby operation of the browning timer 88 is arrested in its normal position.

Also during the operation of the heating apparatus 10 and in response to the absorption of 20/12 kilowatt hours of electromagnetic energy by the roast supported by the turntable 28 in the cavity 25, the motor 99 rotates the control shaft 104 back into its normal position, whereby the control cam 106 opens the switch 107 in order to effect deenergization of the winding of the relay 60 and the consequent restoration thereof. Upon restoring, the relay 60 disconnects, at the bridging members 61 and 62, the supply of power to the generator 32 thereby arresting operation of the generator 32 and the supply of ultra-high frequency electromagnetic energy to the cavity 25. Of course at this time, no currents are derived by the directional couplers 68 and 69 so that the amplifier 81 is driven to cut off, whereby no voltage is supplied to the armature 100 of the motor 99 arresting operation thereof, while the cooking controller 98 occupies its normal position. At this time, the cook may open the start switch 65 in order to arrest operation of the rectifier 66 and the voltage regulator 67 so that the field winding 101 of the motor 99 is deenergized. Also at this time, when the start switch 65 is opened operation of the motor 31 is arrested so as to arrest rotation of the turntable 28 supporting the roast in the cavity 25. At this time, the cook may open the door 12 and remove the roast from the turntable 28 since the roast has been thoroughly cooked and browned.

In passing, it is noted that during the operation of the heating apparatus 10, should the temperature in the cavity 25 rise to a temperature exceeding the preset temperature of 500° F. by virtue of the heat supplied to the cavity 25 by the heating elements 42 and 44, the thermal responsive element 54' will effect operation of the temperature controller 54 so that the bridging members 58 and 59 are operated to interrupt the supply of electric current to the heating elements 42 and 44. Subsequently when the excessive temperature in the cavity 25 subsides, the thermal responsive device 54' again controls the temperature controller 54 so that the bridging members 58 and 59 again close the circuit for supplying electric current to the heating units 42 and 44. Further it should be pointed out that there is no detectable direct heating of the cavity 25 by the ultra-high frequency electro-magnetic energy that is supplied thereto from the generator 32 so that all of the net ultra-high frequency electromagnetic energy that is supplied from the generator 32 to the cavity 25 is absorbed by the roast supported therein upon the turntable 28.

Also in view of the foregoing description, it will be understood that the method and apparatus of the present invention measures the net ultra-high frequency electromagnetic energy that is supplied by the wave in the coaxial line 38 from the generator 32 to the cavity 25, and that in accordance with the method and apparatus of the present invention, the supply of ultra-high frequency electromagnetic power from the generator 32 to the cavity 25 via the coaxial line 38 is controlled in accordance with the absolute ultra-high frequency electromagnetic energy that is absorbed by the roast in the cavity 25. Thus it will be understood that, except for possible damage to the magnetron tube 34, operation of the generator 32 would never be arrested by the cooking controller 98 should the cook fail to place the roast upon the turntable 28 in the cavity 25, since the cooking controller 98 measures the net ultra high frequency electromagnetic energy that is absorbed in the cavity 25. In conjunction with this point, the cook is cautioned that he should never effect operation of the cooking oven 10 in the absence of a suitable load in the cavity 25 that is capable of absorbing the ultra-high frequency electromagnetic energy, since such operation will result in the supply of zero net electromagnetic energy to the cavity 25, the reflected electromagnetic energy from the cavity 25 being equal to the incident electromagnetic energy to the cavity 25. In this case, the reflected electromagnetic energy has a tendency to cause overheating of the magnetron tube 34, notwithstanding the usual water cooling coil, whereby the glass seal in the magnetron tube 34 may become overheated and broken destroying the magnetron tube 34.

The method of the present invention is expressly suited to the heating or cooking of semi-conducting materials, such as foods, since such materials cannot readily be heated by low radio frequency induction heating methods because the electrical resistance thereof is too great, and since such materials cannot readily be heated by high radio frequency dielectric heating methods because the dielectric strength thereof is too small. However when the method of the present invention is employed, the semi-conducting material being heated experiences a substantially uniform and very rapid temperature rise throughout caused by the combined ultra-high frequency electric and magnetic fields within the cavity 25, the wave length of the standing electromagnetic waves in the cavity 25 being of the order of the dimensions of the material being heated; and the exterior surface of the material is adequately heated and browned by the radiant heat supplied by the electric heating units 42, etc.

In the present example, the ultra-high frequency generator 32 illustrated has a rating of 5 kilowatts of ultra-high frequency electromagnetic power which is very advantageous since this rating of the generator 32 permits the thorough cooking of a roast of beef at a rate of 1 pound per minute. Thus in the present example, the generator 32 has a capacity sufficient to cook the 20 pound roast of beef in 20 minutes, but it is more likely that the cooking time will be 21 to 23 minutes depending upon the shape of the roast and its initial characteristics as previously noted. However the time of cooking of the roast is really not important, as the roast will be cooked for an appropriate time interval in order to cause it to absorb 20/12 kilowatt hours of ultra-high frequency electromagnetic energy in accordance with the setting of the cooking controller 98 as previously explained.

Also in passing, it is noted that the disposition and rotation of the turntable 28 in the cavity 25 effects a more uniform distribution of the deep cooking effects that are produced in the roast of beef by virtue of the fact that the standing electromagnetic waves present in the cavity 25 have maximum intensities adjacent to the center of the cavity 25; all as disclosed in the Schroeder Patent No. 2,632,838.

In view of the foregoing, it is apparent that there has been provided an improved apparatus for carrying out heating and cooking operations employing ultra-high frequency electromagnetic energy.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Heating apparatus comprising walls formed of electrically conducting material defining a cavity, an antenna arranged in said cavity, a first source of ultra-high frequency electromagnetic energy, a meter operative to measure the accumulated amount of ultra-high frequency electromagnetic energy absorbed in said cavity as time proceeds, means governed by said meter for selectively controlling the supply of ultra-high frequency electromagnetic energy from said first source to said antenna, an electric heating unit operatively associated with said cavity, a second source of electric current, a manually settable timer, and means governed by said timer for selectively controlling the supply of electric current from said second source to said electric heating unit.

2. Heating apparatus comprising walls formed of electrically conducting material defining a cavity, an antenna arranged in said cavity, a first source of ultra-high frequency electromagnetic energy, a meter operative to measure the accumulated amount of ultra-high frequency electromagnetic energy absorbed in said cavity as time proceeds, a first manually operative device adapted to be selectively set in accordance with a predetermined amount of ultra-high frequency electromagnetic energy to be absorbed in said cavity, means governed jointly by said meter and by said first device for selectively controlling the supply of ultra-high frequency electromagnetic energy from said first source to said antenna, an electric heating unit operatively associated with said cavity, a second source of electric current, a manually settable timer, a second manually settable temperature responsive device operatively associated with said cavity, and means governed jointly by said timer and by said second device for selectively controlling the supply of electric current from said second source to said electric heating unit.

3. In heating apparatus including walls formed of electrically conducting material defining a cavity, means including an antenna arranged in said cavity for supplying ultra-high frequency electromagnetic energy thereto, and means including an electric heating unit arranged in said cavity for supplying radiant heat thereto; the combination comprising a temperature responsive element arranged in said cavity for selectively controlling energization of said electric heating unit, and means including a reticulated metal screen arranged in said cavity for shielding said electric heating unit and said temperature responsive element from the ultra-high frequency electromagnetic energy radiated from said antenna in said cavity.

4. Heating apparatus comprising walls formed of electrically conducting material defining a cavity, an antenna arranged in said cavity, a first source of ultra-high frequency electromagnetic energy, a meter operative to measure the accumulated amount of ultra-high frequency electromagnetic energy absorbed in said cavity as time proceeds, means governed by said meter for selectively controlling the supply of ultra-high frequency electromagnetic energy from said first source to said antenna, an electric heating unit arranged in said cavity, a second source of electric current, a temperature responsive element arranged in said cavity, means including said temperature responsive element for selectively controlling the supply of electric current from said second source to said electric heating unit, and means including a reticulated metal screen arranged in said cavity for shielding said electric heating unit and said temperature responsive element from the ultra-high frequency electromagnetic energy radiated from said antenna in said cavity.

5. Heating apparatus including walls formed of electrically conducting material defining a cavity adapted to receive a load to be heated, and a generator for supplying ultra-high frequency electromagnetic power to said cavity so as to effect heating of the load therein, the total heating effect produced in the load in said cavity being related to the total amount of ultra-high frequency electromagnetic energy absorbed thereby; the combination comprising means for detecting the differences between incident and reflected ultra-high frequency electromagnetic power with respect to said cavity and for integrating said power differences as time proceeds to derive the total ultra-high frequency electromagnetic energy absorbed by the load in said cavity, and means governed by said last-mentioned means for controlling the supply of ultra-high frequency electromagnetic power from said generator to said cavity.

6. Heating apparatus comprising walls formed of electrically conducting material defining a cavity adapted to receive a load to be heated, an ultra-high frequency generator connected to said cavity, means for initiating operation of said generator to supply ultra-high frequency electromagnetic power to said cavity so as to effect heating of the load therein, the total heating effect produced in the load in said cavity being related to the total amount of ultra-high frequency electromagnetic energy absorbed thereby, means for detecting the differences between incident and reflected ultra-high frequency electromagnetic power with respect to said cavity and for integrating said power differences as time proceeds to derive the total ultra-high frequency electromagnetic energy absorbed by the load in said cavity, and means controlled by said last-mentioned means for arresting operation of said generator to supply ultra-high frequency electromagnetic power to said cavity.

7. Heating apparatus comprising walls formed of electrically conducting material defining a cavity adapted to receive a load to be heated, an ultra-high frequency generator, a transmission line connecting said cavity and said generator, means for initiating the supply of ultra-high frequency electromagnetic power from said generator via said line to said cavity so as to effect heating of the load therein, the total heating effect produced in the load in said cavity being related to the total amount of ultra-high frequency electromagnetic energy absorbed thereby, means for detecting the differences between incident and reflected ultra-high frequency electromagnetic power with respect to said line and for integrating said power differences as time proceeds to derive the total ultra-high frequency electromagnetic energy absorbed by the load in said cavity, and means controlled by said last-mentioned means for arresting the supply of ultra-high frequency electromagnetic power from said generator via said line to said cavity.

8. Heating apparatus comprising walls formed of electrically conducting material defining a cavity adapted to receive a load to be heated, means including an antenna for producing centimeter electromagnetic standing waves in said cavity, an ultra-high frequency generator connected to said antenna, means for initiating operation of said generator to supply ultra-high frequency electromagnetic power to said antenna so as to effect heating of the load in said cavity, the total heating effect produced in the load in said cavity being related to the total amount of ultra-high frequency electromagnetic energy absorbed thereby, means for detecting the differences between incident and reflected ultra-high frequency electromagnetic power with respect to said antenna and for integrating said power differences as time proceeds to derive the total ultra-high frequency electromagnetic energy absorbed by the load in said cavity, and means controlled by said last-mentioned means for arresting operation of said generator to supply ultra-high frequency electromagnetic power to said antenna.

9. Heating apparatus comprising walls of electrically conducting material defining a cavity adapted to receive a load to be heated, an ultra-high frequency generator, a transmission line connecting said cavity and said generator, said generator being operative to supply ultra-high frequency electromagnetic power via said line to said cavity so as to effect heating of the load therein, the total heating effect produced in the load in said cavity being related to the total amount of ultra-high frequency electromagnetic energy absorbed thereby, means for detecting the differences between incident and reflected ultra-high frequency electromagnetic power with respect to said line and for integrating said power differences as time proceeds to derive the total ultra-high frequency electromagnetic energy absorbed by the load in said cavity, and means for selectively controlling operation of said generator.

10. Heating apparatus comprising walls formed of electrically conducting material defining a cavity adapted to receive a load to be heated, an ultra-high frequency generator, a transmission line connecting said cavity and said generator, said generator being operative to supply ultra-high frequency electromagnetic power via said line to said cavity so as to effect heating of the load therein, the total heating effect produced in the load in said cavity being related to the total amount of ultra-high frequency electromagnetic energy absorbed thereby, control means for detecting the differences between incident and reflected ultra-high frequency electromagnetic power with respect to said line and for integrating said power differences as time proceeds to derive the total ultra-high frequency electromagnetic energy absorbed by the load in said cavity, a manually operable device adapted to be selectively set in accordance with a predetermined amount of ultra-high frequency electromagnetic energy to be absorbed by the load in said cavity, means for initiating operation of said generator, and means governed by operation of said control means to derive a total ultra-high frequency electromagnetic energy corresponding to that preset by said device for arresting operation of said generator.

References Cited in the file of this patent

UNITED STATES PATENTS

| | | |
|---|---|---|
| 1,230,357 | Woodrow | June 19, 1917 |
| 1,288,589 | Hood | Dec. 24, 1918 |
| 1,434,362 | Bliss | Nov. 7, 1922 |
| 1,900,573 | McArthur | Mar. 7, 1933 |
| 2,137,133 | Dallmann | Nov. 15, 1938 |
| 2,312,917 | Lehane | Mar. 2, 1943 |
| 2,392,166 | Lockwood | Jan. 1, 1946 |
| 2,416,977 | Brown et al. | Mar. 4, 1947 |
| 2,425,030 | Clark | Aug. 5, 1947 |
| 2,443,097 | Crosby | June 8, 1948 |
| 2,443,637 | Ovrebo | June 22, 1948 |
| 2,454,370 | Beaubien | Nov. 23, 1948 |
| 2,480,679 | Spencer | Aug. 30, 1949 |
| 2,491,687 | Nutt | Dec. 20, 1949 |
| 2,495,435 | Welch | Jan. 24, 1950 |
| 2,500,752 | Hanson et al. | Mar. 14, 1950 |
| 2,540,036 | Spencer | Jan. 30, 1951 |
| 2,562,281 | Mumford | July 31, 1951 |
| 2,595,748 | Andrews | May 6, 1952 |
| 2,597,825 | Schroeder | May 20, 1952 |
| 2,602,828 | Norton | July 8, 1952 |
| 2,602,835 | Hershberger | July 8, 1952 |
| 2,611,030 | Sontheimer | Sept. 16, 1952 |
| 2,611,804 | Zaleski | Sept. 23, 1952 |
| 2,648,048 | Vackar | Aug. 4, 1953 |
| 2,659,860 | Breazeale | Nov. 17, 1953 |

OTHER REFERENCES

The Baker's Digest, August 1948, pages 67, 68, 69 and 86.